(12) United States Patent
Crow, Jr.

(10) Patent No.: US 12,246,679 B1
(45) Date of Patent: *Mar. 11, 2025

(54) SYSTEM FOR TRANSPORTING AN ITEM IN A VEHICLE

(71) Applicant: Robert Elvin Crow, Jr., Roswell, NM (US)

(72) Inventor: Robert Elvin Crow, Jr., Roswell, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/584,728

(22) Filed: Feb. 22, 2024

Related U.S. Application Data (63) Continuation of application No. 18/382,919, filed on Oct. 23, 2023, which is a continuation-in-part of application No. 17/464,548, filed on Sep. 1, 2021, now Pat. No. 11,827,135.

(60) Provisional application No. 63/183,457, filed on May 3, 2021.

(51) Int. Cl.
*B60R 7/02* (2006.01)
*B60R 13/01* (2006.01)
*B62D 33/02* (2006.01)

(52) U.S. Cl.
CPC ............... *B60R 7/02* (2013.01); *B60R 13/01* (2013.01); *B60R 13/011* (2013.01); *B62D 33/02* (2013.01)

(58) Field of Classification Search
CPC .......... B60N 3/10; B60N 3/101; B60N 3/102; B60R 3/044; B60R 7/02; B60R 7/085; B60R 2011/029; B60R 2011/0036; B60R 2011/004; B60R 13/01; B60R 13/011; B60R 13/013; B60R 13/0815; B60R 13/0268; B62D 25/20; B62D 33/02
See application file for complete search history.

(56) References Cited

U.S. PATENT DOCUMENTS

| | | | | |
|---|---|---|---|---|
| 4,875,730 | A * | 10/1989 | Justice | B60P 7/14 296/37.6 |
| 5,456,514 | A * | 10/1995 | Justice | B60P 7/135 224/403 |
| 6,254,162 | B1 | 7/2001 | Faber et al. | |
| 6,673,409 | B1 | 1/2004 | Wheatley | |
| 6,719,348 | B1 | 4/2004 | Song | |
| 6,752,304 | B1 | 6/2004 | Hotary et al. | |
| 6,827,385 | B2 * | 12/2004 | Mobley | B60P 7/0892 410/129 |
| 6,971,827 | B1 | 12/2005 | Embach | |
| 7,290,820 | B1 | 11/2007 | Smith et al. | |
| 10,518,712 | B1 | 12/2019 | Kim et al. | |
| 10,899,287 | B1 * | 1/2021 | Conley | B32B 5/18 |
| 11,827,135 | B1 * | 11/2023 | Crow, Jr. | B62D 25/20 |
| 2002/0171022 | A1 | 11/2002 | Hsu | |
| 2004/0164587 | A1 | 8/2004 | Pickard | |
| 2005/0189387 | A1 | 9/2005 | Fatigati | |

(Continued)

*Primary Examiner* — Gregory A Blankenship
(74) *Attorney, Agent, or Firm* — Plager Schack LLP; Mark H. Plager, Esq.; Naomi Mann, Esq.

(57) ABSTRACT

A system for transporting items within a vehicle comprises providing a recessed cavity within the floor of the vehicle and placing the item within the recessed cavity. In certain embodiments, the recessed cavity may be provided within the trunk or flatbed of the vehicle and may include a heat-resistant and/or non-slip lining. In some further embodiments, the recess may include a cover having a top surface matching that of the vehicle floor, which may situate within the recessed cavity when not in use.

16 Claims, 9 Drawing Sheets

(56) References Cited

U.S. PATENT DOCUMENTS

| | | |
|---|---|---|
| 2006/0038423 A1* | 2/2006 | Nilsrud ................. B60R 7/02 |
| | | 296/37.5 |
| 2006/0121250 A1 | 6/2006 | Wheatley |
| 2008/0061576 A1 | 3/2008 | Hwang |
| 2009/0173759 A1 | 7/2009 | Edwards |
| 2010/0230571 A1 | 9/2010 | Sharkey et al. |
| 2014/0354003 A1* | 12/2014 | Murray ................. B60R 5/04 |
| | | 296/37.16 |
| 2016/0059790 A1* | 3/2016 | Perelli ................. B60R 7/04 |
| | | 224/486 |
| 2016/0107584 A1 | 4/2016 | Coyle et al. |
| 2017/0050579 A1 | 2/2017 | Ranka et al. |
| 2018/0208129 A1 | 7/2018 | Mejia Barajas |
| 2019/0071022 A1 | 3/2019 | Guarneros et al. |
| 2019/0283655 A1 | 9/2019 | Salter et al. |
| 2019/0291649 A1 | 9/2019 | Ito |
| 2021/0188180 A1 | 6/2021 | Reyes Marcial |
| 2022/0097611 A1 | 3/2022 | Clifford et al. |
| 2022/0126755 A1 | 4/2022 | Kraus et al. |
| 2022/0126929 A1 | 4/2022 | Phillips |
| 2022/0144352 A1 | 5/2022 | Nelson |
| 2022/0185192 A1 | 6/2022 | Gill et al. |
| 2022/0194300 A1 | 6/2022 | Ritter et al. |
| 2022/0234520 A1 | 7/2022 | Jayakumar et al. |
| 2022/0266756 A1 | 8/2022 | Harmon et al. |

\* cited by examiner

SYSTEM FOR TRANSPORTING AN ITEM IN A VEHICLE

RELATED APPLICATION

This application is a Continuation-In-Part (CIP) of U.S. application Ser. No. 18/382,919 filed Oct. 23, 2023, which is a Continuation-In-Part (CIP) of U.S. application Ser. No. 17/464,548 filed on Sep. 1, 2021, and which claims benefit to U.S. Application No. 63/183,457 filed on May 3, 2021, all of which are incorporated herein by this reference. U.S. application Ser. No. 17/464,548 has granted a patent No. U.S. Pat. No. 11,827,135B1 which was issued Nov. 28, 2023.

BACKGROUND

The embodiments herein relate generally to systems for transportation of various items in a vehicle.

Items transported in a vehicle may slide around and/or spill (for example, in case of food or liquid items) due to the motion of the vehicle. In some cases, this may damage and/or dirty the surface lining of the vehicle.

As such, there is a need for an improved system for securely transporting items in a vehicle, that addresses the above-mentioned problems of the prior art.

SUMMARY

According to various embodiments, disclosed is a method for transporting an item in a vehicle, the method comprising: placing the item within a recessed cavity provided in a floor section of the vehicle, wherein the recessed cavity has a bottom lining made of a slip resistant material and at least one side wall, wherein the slip resistant material prevents the item from tumbling during transport, wherein the recessed cavity is a depression carved within the floor section of the vehicle, and wherein the side wall extends downwards from the floor section. In some embodiments, the recessed cavity includes a cover, the cover being configured to situate within the recessed cavity and to be removed from the recessed cavity, wherein a top surface of the cover integrates with said floor section of the vehicle, such that the cover aligns with the floor section to provide a leveled and substantially uninterrupted floor when the cover is situated within said recessed cavity. In some embodiments, the top surface of the cover is made of a material which matches a material of the floor section. In certain embodiments, the method further comprises removing the cover from the recessed cavity prior to placing the item within the recessed cavity. In some embodiments, the cover includes a handle configured to facilitate its removal from the recessed cavity.

In certain embodiments, the method further comprises attaching the cover to a designated attachment section in the vehicle after removing the cover from the recessed cavity, said designated attachment section being configured to secure the cover to prevent it from moving within the vehicle. In some embodiments, the designated attachment section is in the floor section. In some embodiments, the cover is hingedly coupled proximate an edge of the recessed cavity. In certain embodiments, the recessed cavity is provided in the floor section of the vehicle trunk or flatbed. In certain embodiments, the material of the bottom lining of the recessed cavity is further heat resistant. In some embodiments, the recessed cavity has a depth less than the thickness of the vehicle floor. In some embodiments, the recessed cavity has a depth of between about ¼ of an inch to about 3 inches. In certain embodiments, the recessed cavity is rectangular. In some embodiments, the slip resistant material is silicone. In some embodiments, item is a food item within a container. In some embodiments, the item comprises one or more grocery bags. In some embodiments, the item is a cooler.

According to various embodiments, disclosed is a system for transporting food within a vehicle, which may comprise providing a recessed cavity within the floor of the vehicle and placing a food container within the recessed cavity. In certain embodiments, the recessed cavity may be provided within the floor of the trunk of a car vehicle or flatbed of a truck vehicle. The recessed cavity may comprise a heat-resistant and/or non-slip lining which prevents the food container from slipping/tumbling, and may further hold a heated food container without damage to the lining.

In some embodiments, a cover may be provided for placement inside the recessed cavity when not in use, wherein the cover may be removed to reveal the recessed cavity. The cover may have a leveled top surface, which matches that of the vehicle floor, such that it is camouflaged within the vehicle floor. For example, the cover may be topped with a carpeted or upholstery surface, or may be painted to match the vehicle floor surface. In some further embodiments, the cover may be hinged proximate the recessed cavity, or may be provided with an attachment element for attaching the cover to a section of the vehicle when removed from the cavity.

In certain embodiments of the invention, provided is a method for transport of food in a vehicle, comprising: placing a food container within a recessed cavity provided in a floor section of the vehicle, wherein the recessed cavity has a bottom lining made of a slip resistant material and at least one side wall, wherein the slip resistant material prevents the food container from tumbling during transport, wherein the recessed cavity is a depression carved within the floor section of the vehicle, and wherein the side wall extends downwards from the floor section. In some embodiments, the recessed cavity includes a cover, the cover being configured to situate within the recessed cavity and to be removed from the recessed cavity, wherein a top surface of the cover integrates with said floor section of the vehicle, such that the cover aligns with the floor section to provide a leveled and substantially uninterrupted floor when the cover is situated within said recessed cavity. In certain embodiments, the cover is made of a material which matches a material of the floor section. In some embodiments, the method further comprises removing the cover from the recessed cavity prior to placing the food container within the recessed cavity. In certain embodiments, the cover includes a handle configured to facilitate its removal from the recessed cavity. In certain embodiments, the method further comprises attaching the cover to a designated attachment section in the vehicle after removing the cover from the recessed cavity, said designated attachment section being configured to secure the cover to prevent it from moving within the vehicle. In some embodiments, the designated attachment section is in the floor section. In certain embodiments, the cover is hingedly coupled proximate an edge of the recessed cavity. In some embodiments, the recessed cavity is provided in the floor section of the vehicle trunk or flatbed. In certain embodiments, the material of the bottom lining of the recessed cavity is further heat resistant. In certain embodiments, the recessed cavity has a depth less than the thickness of the vehicle floor. In some embodiments, the recessed cavity has a depth of between about ¼ of an inch to about 3 inches. In certain embodiments, the recessed cavity is rectangular. In certain embodiments, the slip resistant material of the recessed cavity is silicone.

In certain embodiments of the invention, provided is a method for transport of food in a vehicle, comprising: placing a cover having a slip and heat resistant top surface over a floor section of the vehicle, the cover further comprising a bottom surface including an anchor element which prevents the cover from slipping with respect to said floor section of the vehicle; and placing a food container on the slip and heat resistant surface, wherein the slip resistant material prevents the food container from tumbling during transport.

In certain embodiments of the invention, provided is a cover configured to provide a heat and slip resistant surface within a vehicle, for the transport of food. In embodiments, the cover may comprise a slip and heat resistant top surface, and a bottom surface including an anchor element configured to prevent the cover from slipping with respect to the floor section of the vehicle. In some embodiments, the anchor element may comprise pointed steel pegs.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

According to various embodiments as depicted in FIGS. 1-8, disclosed is a system for transport of items in a vehicle 20, which comprises providing a recessed cavity 10 within the vehicle floor, i.e. floorboard of the vehicle. In some embodiments, the recessed cavity 10 may be lined with a non-slip and/or heat resistant lining. In certain embodiments, recessed cavity 10 may be located in the vehicle floor of the trunk or truck bed of vehicle 20. It shall be understood that in alternate embodiments, recessed cavity 10 may be provided at a different location, such as a passenger seating area within the floor of vehicle 20. Vehicle 20 may be for example, a van, car, truck, SUV, wagon vehicle, and the like. It shall be appreciated that the disclosed system may be used for non-land vehicles, such as boats, aircraft, and the like.

In certain embodiments, the disclosed system may be used for transport of various items within the recessed cavity, including but not limited to contained loose items, bulky items, large items, items prone to slipping/rolling, etc. These may include for example, cooked or uncooked foods (which may be contained in a pot), groceries (contained in grocery bags), coolers (e.g., containing ice or drinks), clothing, toys, tools, bulky items, wheeled items, sport items, balls, suitcases, etc. In certain embodiments as exemplified in the figures, the disclosed system may be used for transporting a food container 22. Food container 22 may be a pot, pan, crockpot, and the like. In certain embodiments, food container may contain hot and/or liquid food, such as a stew, soup, and the like. Cavity 10 is configured to prevent food container 22 from sliding and/or tipping due to the jostling motion of the vehicle, thereby preventing the food from spilling out of container 22. Additionally, cavity 10 may prevent damage to the upholstery and/or plastic material that may line certain vehicles, and may be susceptible to damage from heat.

In embodiments, recessed cavity 10 may be a depression carved within the vehicle floor, which may have a depth less than the thickness of the vehicle floor. This may be for example, a depression of between about ¼ of an inch to about 3 inches, depending on the thickness of the vehicle floor. According to an exemplary embodiment, recessed cavity 10 may be sized to retain a standard large or medium sized food container and may be rectangular, as shown in the figures. This geometric configuration may be advantageous in preventing an oval container from laterally twisting within cavity 10. In one embodiment, recessed cavity 10 may have a length of between about 1.5 feet to about 8 inches, and a width of about 1.2 feet to about 5 inches. However, it should be appreciated that the size, dimensions, and geometric shapes/configurations of recessed cavity 10 may vary in alternate embodiments. Additionally, in some further embodiments, a wedge element (not shown) may be placed between food container 22 and the side walls of recessed cavity 10, to tighten the fit and provide added security of the food container within the cavity. The wedge component may be, for example a towel or other compressible object, according to various embodiments. According to another embodiment, recessed cavity 10 may be a rectangle which is sized to retain one or more standard paper grocery bags. According to another embodiment, recessed cavity 10 may be a rectangle which is sized to retain a cooler.

In embodiments, recessed cavity 10 may be provided with a lining material 12 (cavity lining 12), which is heat and slip resistant. In certain embodiments, cavity lining 12 may cover at least a portion of the bottom surface of recessed cavity 10, and may be made of a material different from the lining 18 of the vehicle floor. In some embodiments, cavity lining 12 may be made from a material which is slip resistant, heat resistant, and easy to clean. For example, cavity lining 12 may be made of a silicone material, which has both high friction and heat resistance, to prevent food container 22 or other item from sliding, and/or damaging the cavity lining. Thus, cavity lining 12 and/or its side walls may work in concert to prevent a food container, grocery bag, cooler, or other item from spilling, sliding, shifting, rolling, etc., during transport, while providing a surface which is easy to clean in the event of food, mud, or other dirt soiling the surface. This is particularly advantageous in maintaining the cleanliness of vehicles which are upholstered (e.g. with textile, carpet, and the like), and for transport of liquid or spillable food. In certain embodiments, cavity lining 12 may further be removable for easy cleaning.

In certain embodiments, recessed cavity 10 may include a cover 14. Cover 14 may be configured to snuggly fit within cavity 10, and to provide a leveled vehicle floor when the recessed cavity is not being used. In certain embodiments, cover 14 and recessed cavity 10 may have corresponding tapered side walls, such that the cover fits securely within the recessed cavity, with minimal gaps between the cover and vehicle floor, as particularly depicted in FIGS. 5 and 6. Additionally, the top surface of cover 14 may be provided with a lining 18, which matches the material of lining 18 of the vehicle floor. Thus, cover 14 integrates with the vehicle floor, to provide a unitary/uninterrupted and leveled vehicle floor surface, when placed over recessed cavity 10. According to an exemplary embodiment, cover 14 may be made of a plastic or metal material, which is lined with an upholstery matching that of the vehicle floor; or which is painted at its top surface and/or provided with a rhino lining and/or bedliners (e.g., plastic or spray in) to match the truck bed. In some further embodiments, the top surface of cover 14 may include a strap or handle (not shown) to facilitate a user in lifting it from cavity 10.

According to one embodiment as shown in FIGS. 1-6, cover 14 may be entirely removable from cavity 10. Additionally, an attachment mechanism may be provided to attach the cover to the vehicle floor and allow it to be stowed, i.e. in the trunk or truck bed, when removed from the recessed cavity. The attachment mechanism may include, for example, a peg or male clip component 16, which fits within a hollow or female clip component 17, provided within the vehicle floor outside the recessed cavity. In some other embodiments, an attachment element, such as retaining clips may be located at a side wall of the vehicle. As such, the cover may be kept out of the way, and prevented from sliding around during transport.

Figure 1:
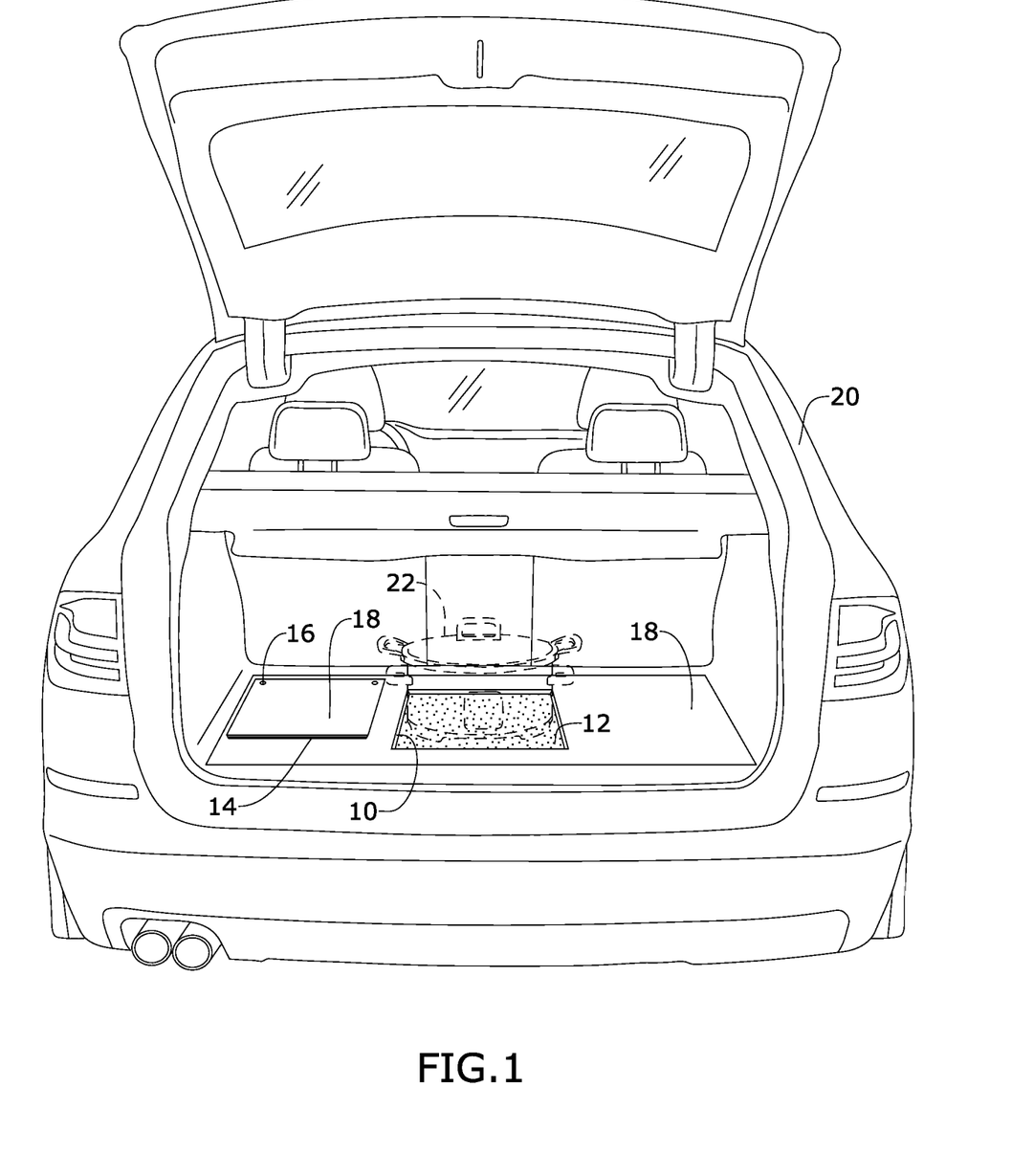
FIG. 1 shows a system for transporting an item in a vehicle comprising a recessed cavity and a cover, according to various embodiments.
Figure 2:
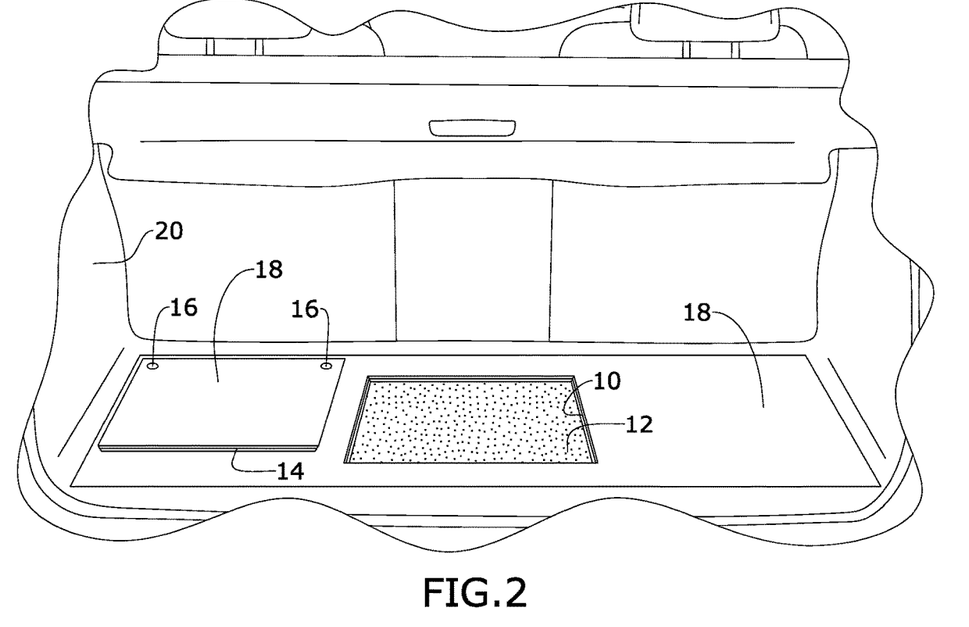
FIG. 2 is an enlarged perspective view of the system depicted in FIG. 1, and showing the cover in an uninstalled state.
Figure 3:
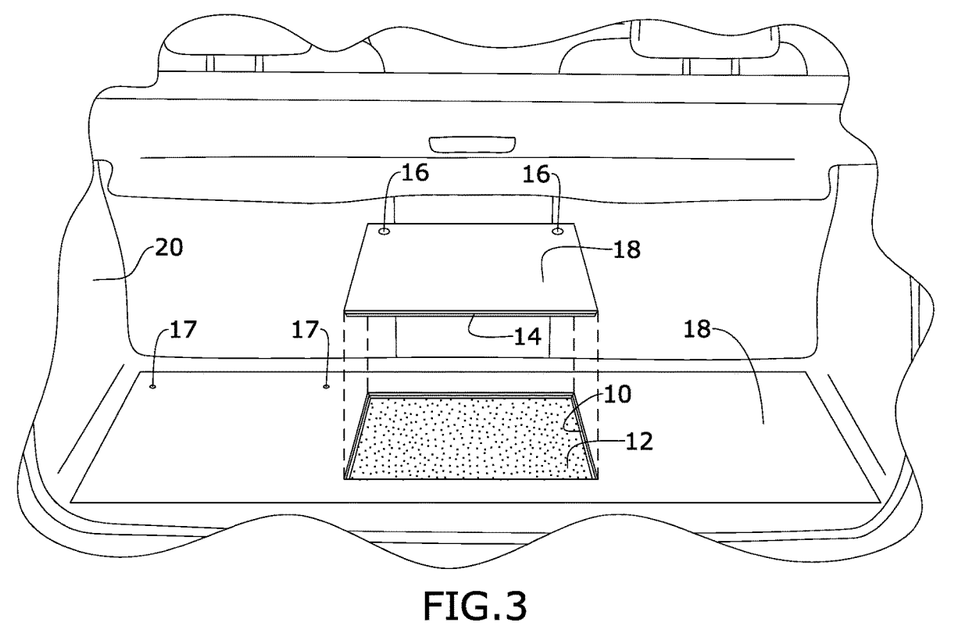
FIG. 3 is an enlarged perspective view of the system depicted in FIG. 1, detailing alignment of the cover for installation over the recessed cavity.
Figure 4:
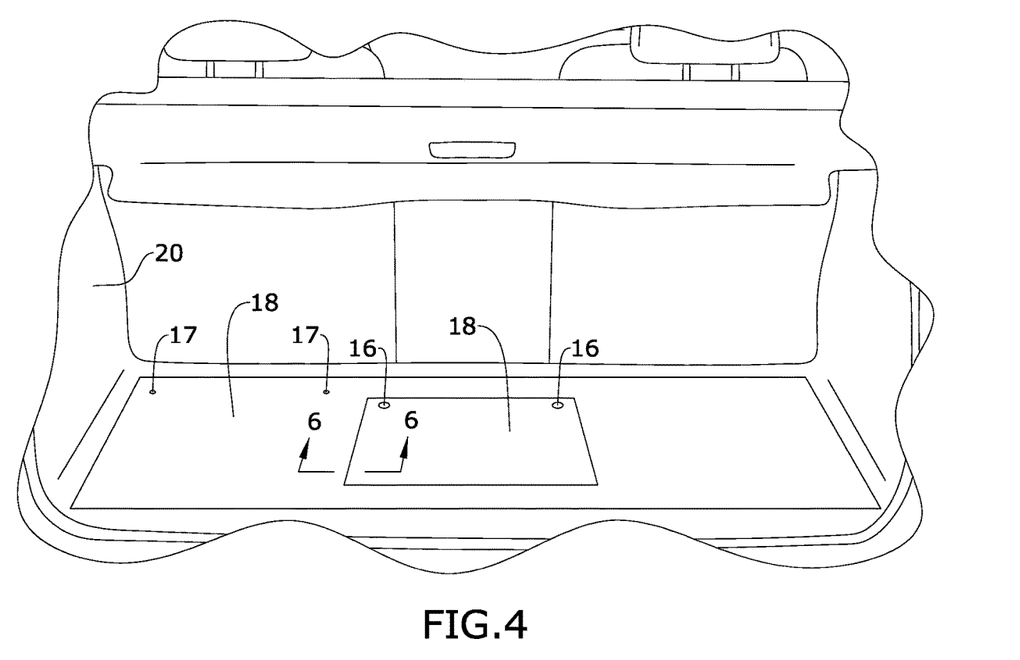
FIG. 4 is an enlarged perspective view of the system depicted in FIG. 1, showing the cover in an installed state.
Figure 5:
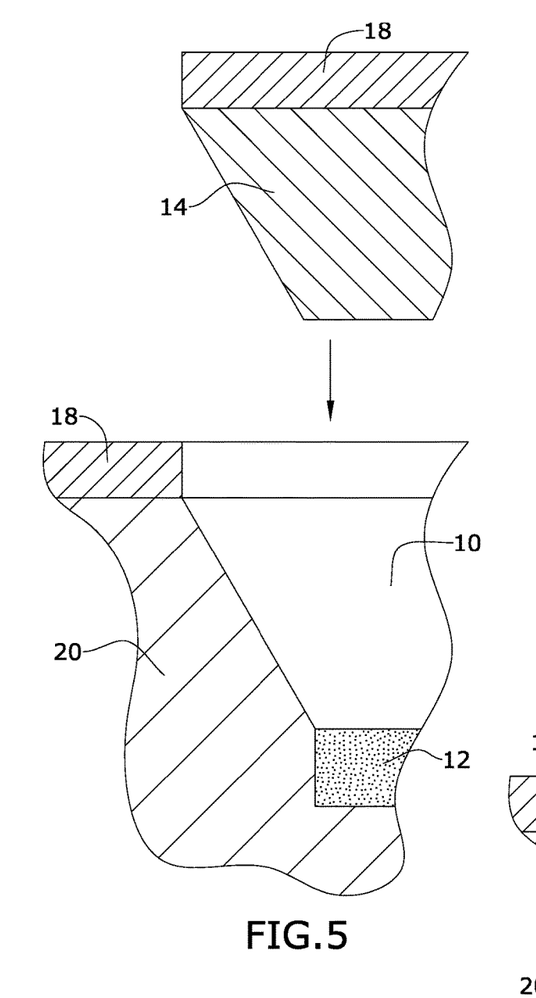
FIG. 5 is a sectional view taken along line 6-6 of FIG. 4, depicting a process for installation of the cover.
Figure 6:
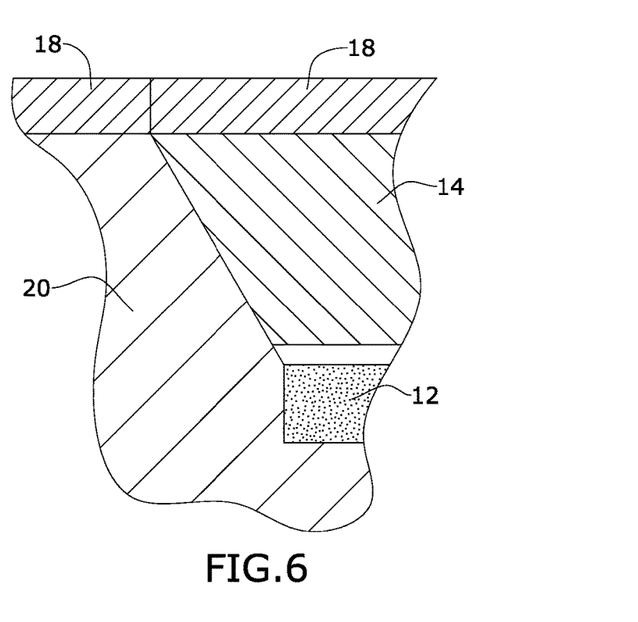
FIG. 6 is a sectional view taken along line 6-6 of FIG. 4, depicting the cover in an installed state.
Figure 7A:
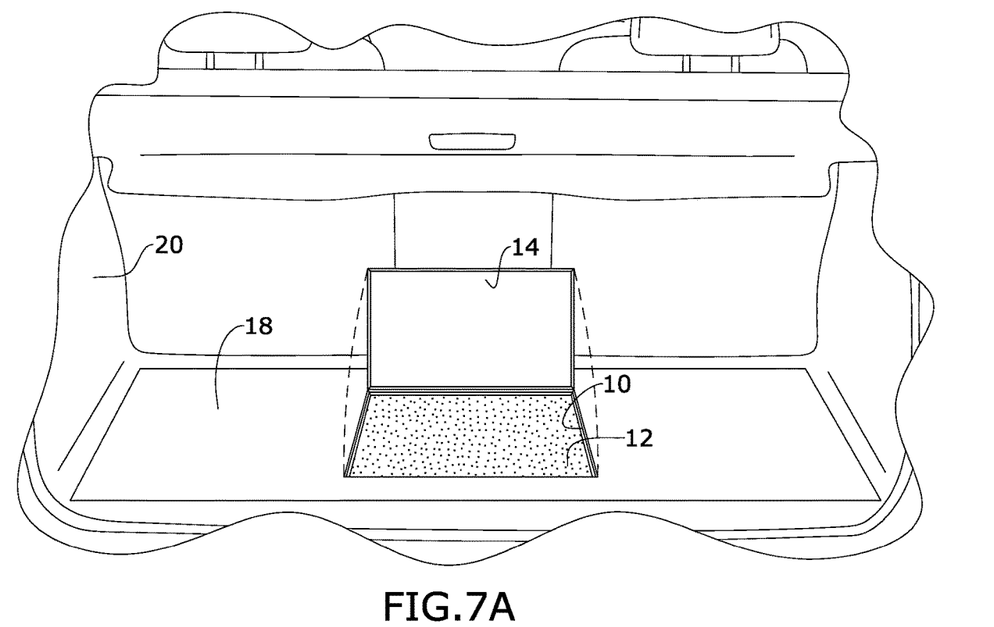
FIG. 7A depicts an alternate embodiment of the cover, in an opened position.
Figure 7B:
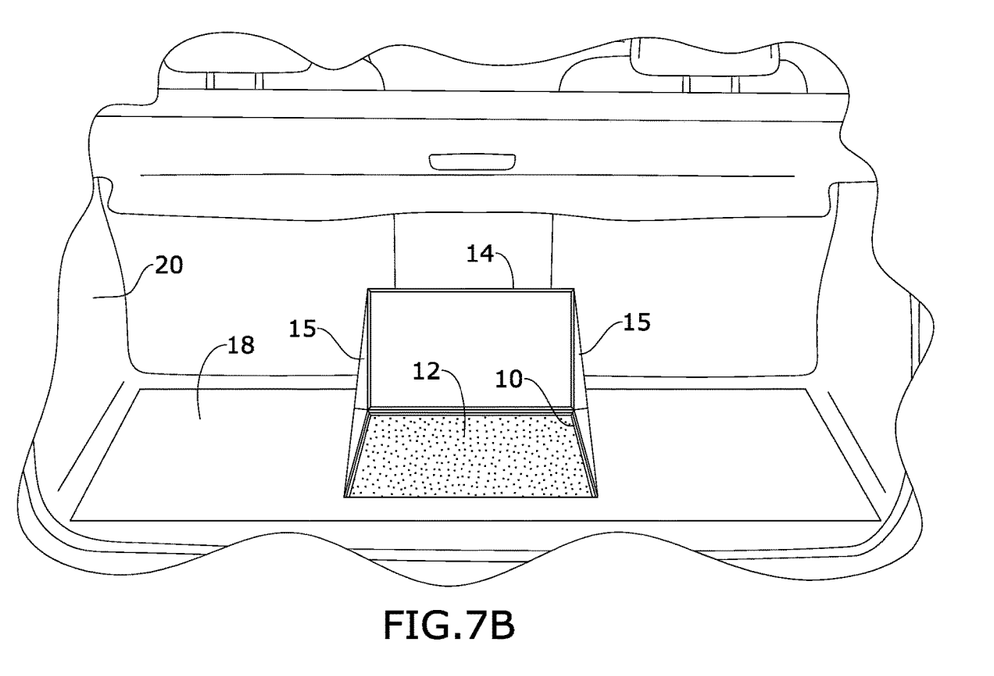
FIG. 7B depicts the cover of FIG. 7A with added side flaps, according to an alternate embodiment.
Figure 7C:
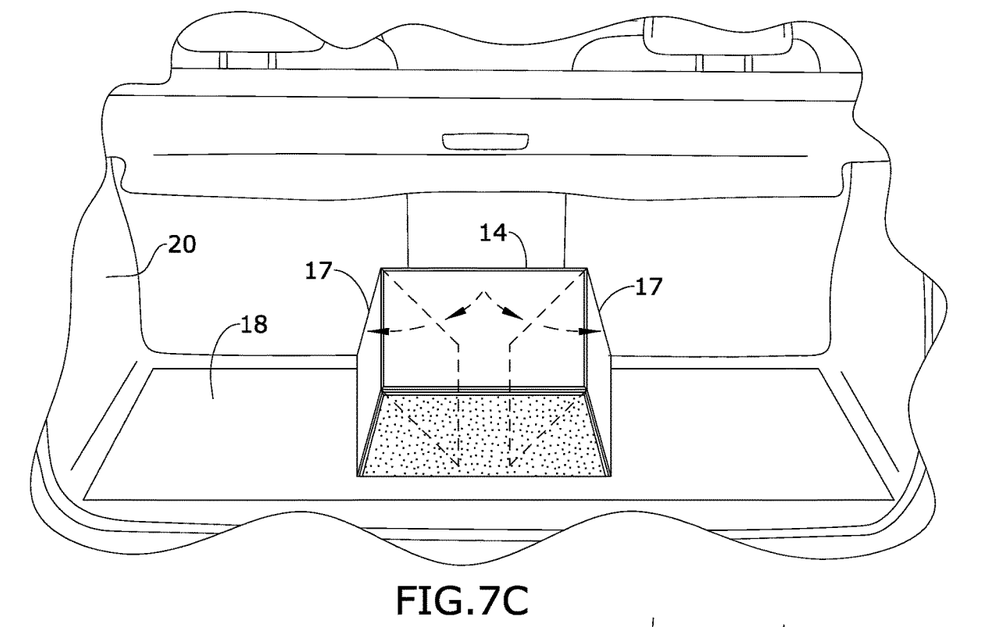
FIG. 7C depicts the cover of FIG. 7A with side flaps that are foldable, according to an alternate embodiment.
Figure 8:
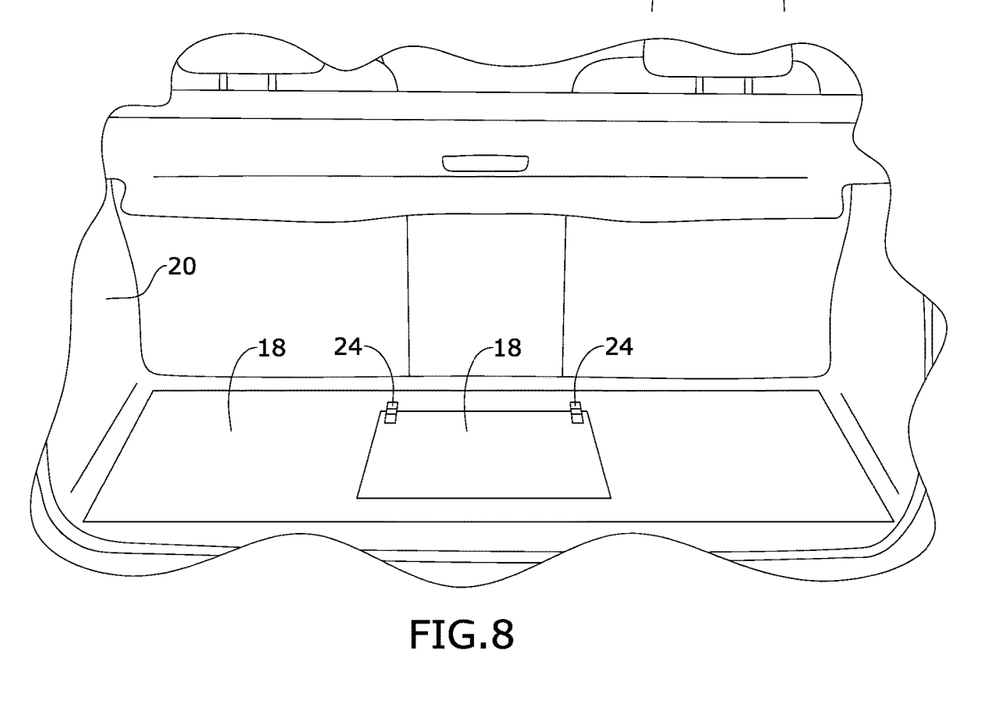
FIG. 8 depicts the cover of FIG. 7A in a closed position.

According to a second embodiment, as depicted in FIGS. 7A-8, cover 14 may be hinged proximate recessed cavity 10, via a hinge attachment element 24. As such, cover 14 may remain attached to recessed cavity 10 during use, and prevented from slipping/tumbling during transport. In some embodiments as depicted in FIGS. 7B and 7C, cover 14 may comprise fixed side flaps 15 (see FIG. 7B) or foldable side flaps 17 (see FIG. 7C) that may shield an object placed inside recessed cavity. In some embodiments, fixed side flaps 15 may perpendicularly extend from cover 14. In some embodiments as best depicted in FIG. 7C, foldable side flaps 17 may be hingedly coupled to cover 14 so that they may be folded parallel to cover 14 for stowage, and folded outwards to extend perpendicularly to the cover when need for use. As such, an object placed inside recessed cavity 10 may be shielded by cover 14 on its rear side, and by the side flaps on its left and right sides. In some further embodiment, a front flap (not shown) may be coupled to a front side of one of the foldable side flaps 17, so that the object may further be shielded on its front side. It shall be appreciated slide flaps 15 may be of different shapes, sizes, and/or dimensions in alternate embodiments. For example, side flaps 15 may be configured to fit within cavity 10 without needing to be folded in some alternate embodiments. In some alternate embodiments a front flap In operation, a user may lift cover 14 to reveal recessed cavity 10, and place a food container 22, such as a crock pot, pan, other cookware, etc., within recessed cavity 10. In some embodiments, the food container may be held in place, and prevented from shifting around due to the slip resistant lining 12 of the recessed cavity. In certain embodiments, the side walls of recessed cavity 10 may further prevent food 22 from shifting during transport. In some further embodiments, a wedge component, such as a towel, may be placed between the food container and side walls of the recessed cavity to further secure the container. As such, the food container may be transported without spilling and creating a mess in the vehicle and/or ruining the food. During transport, the cover may be attached to the floor of the vehicle via an attachment mechanism, or may remain hinged to the recessed cavity and lifted out of the way.

Figure 9:
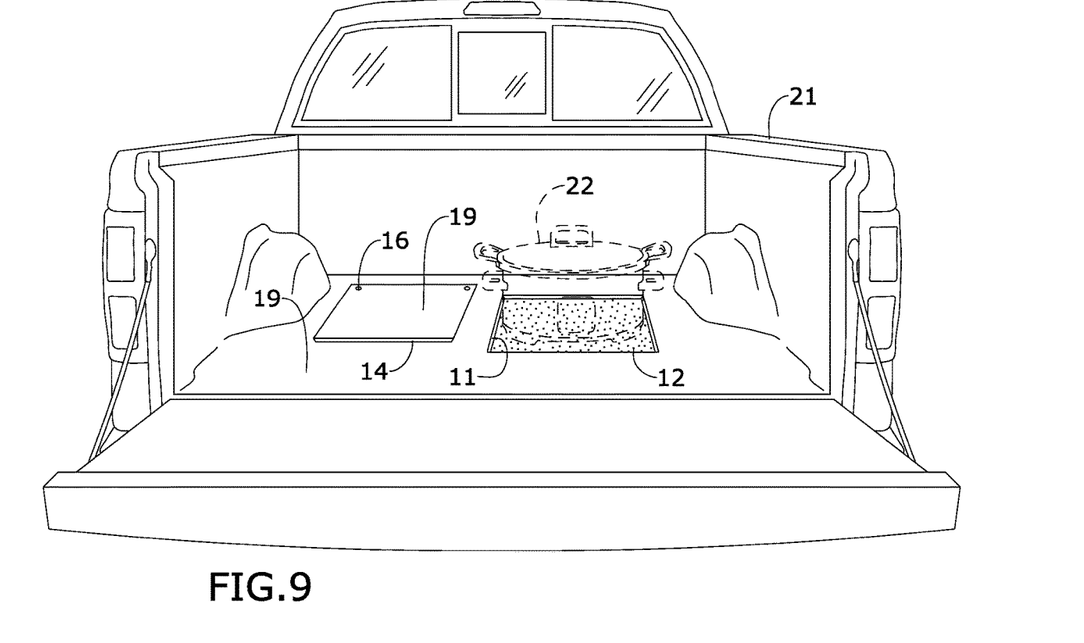
FIG. 9 shows the system applied to a bed of a truck vehicle, according to an alternate embodiment.
Figure 10:
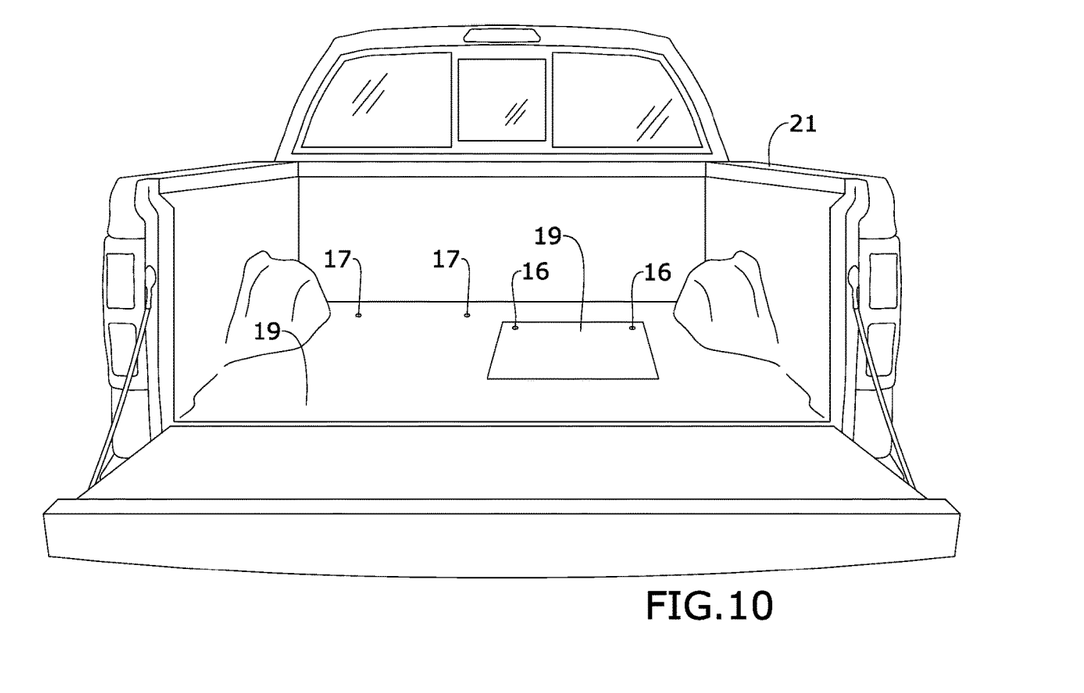
FIG. 10 shows the system depicted in FIG. 9, with the cover depicted in a closed position.
Figure 11:
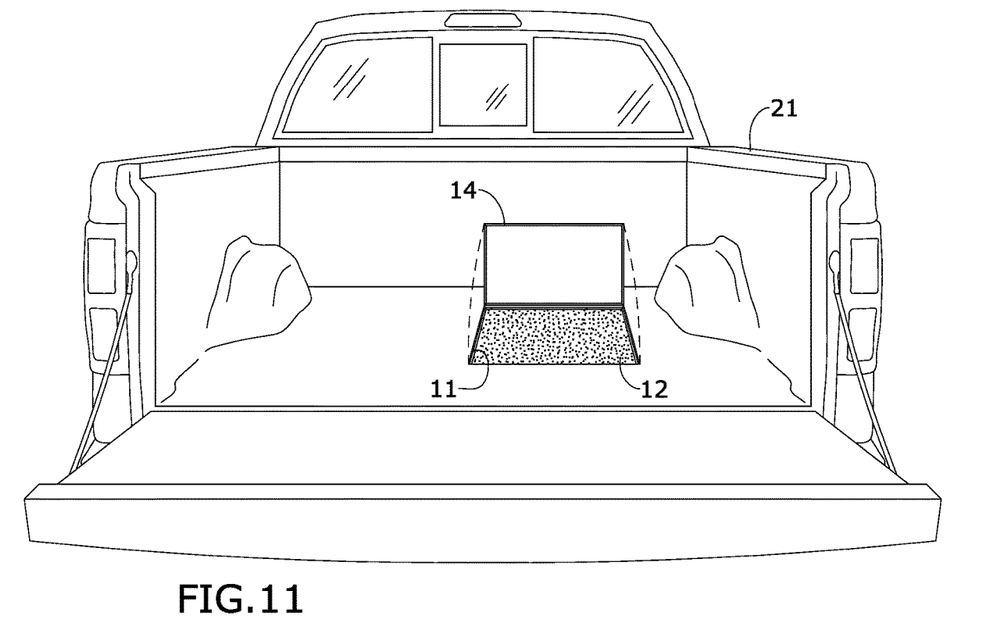
FIG. 11 shows the system of FIG. 9, depicting an alternate embodiment for the cover which is shown in an opened position.
Figure 12:
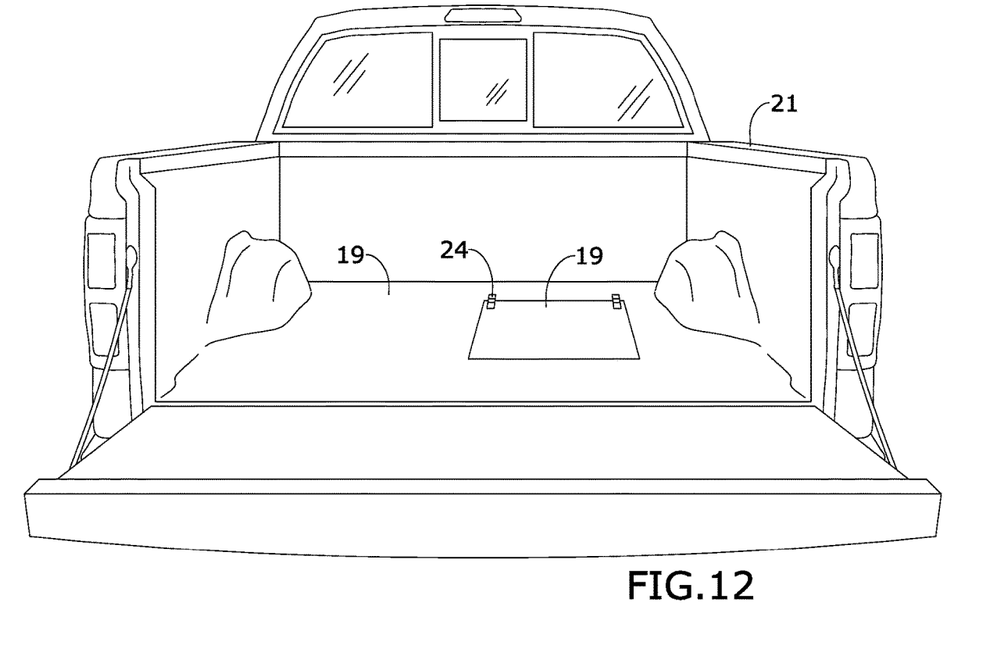
FIG. 12 shows the cover of FIG. 11 in a closed position.

FIGS. 9-12 show an alternate embodiment of a recessed cavity 11 which is specifically configured for a truck vehicle 21. In embodiments, recessed cavity 11 ("truck bed recessed cavity 11") is similar to recessed cavity 10, and may be provided within the truck bed 19 of truck vehicle 21. In embodiments, truck bed recessed cavity 11 may comprise cavity lining 12, which covers at least a portion of the bottom surface of recessed cavity 11, and may be made of a material different from the material of truck bed 19. In some embodiments, cavity lining 12 may be removable for cleaning. In embodiments, truck bed recessed cavity 11 may be provided with cover 14. Cover 14 may include a top surface, which is of the same material as the material of truck bed 19. As such, cover 14 may integrate with truck bed 19 to provide a unitary and leveled truck bed surface when placed over recessed cavity 11. In one embodiment, as depicted in FIGS. 9-10, cover 14 for track bed recessed cavity 11 may comprise male clip component(s) 16, which are configured to insert into female clip component(s) 17, within truck bed 19. This provides an attachment mechanism which allows cover 14 to be stowed in truck bed 19 when removed from truck bed recessed cavity 11. In an alternate embodiment, as depicted in FIGS. 11-12 cover 14 may be hinged proximate an edge of the recessed cavity 11 via hinge attachment element 24.

Figure 13:
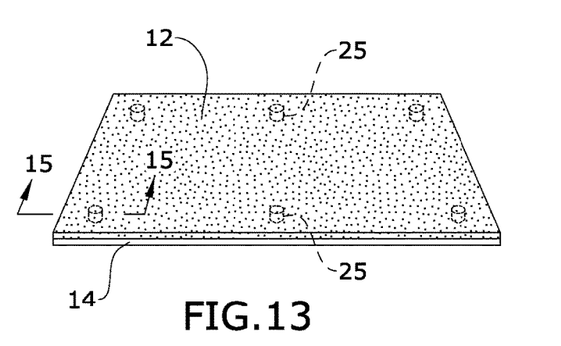
FIG. 13 is a top perspective view of a standalone unit for a system for transporting items in a vehicle, according to an alternate embodiment.
Figure 14:
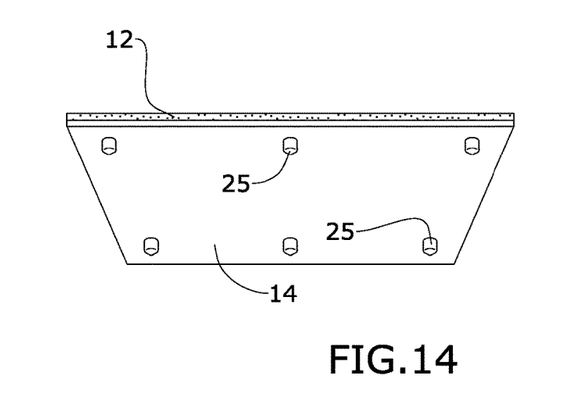
FIG. 14 is a bottom perspective view of the standalone unit of FIG. 13.
Figure 15:
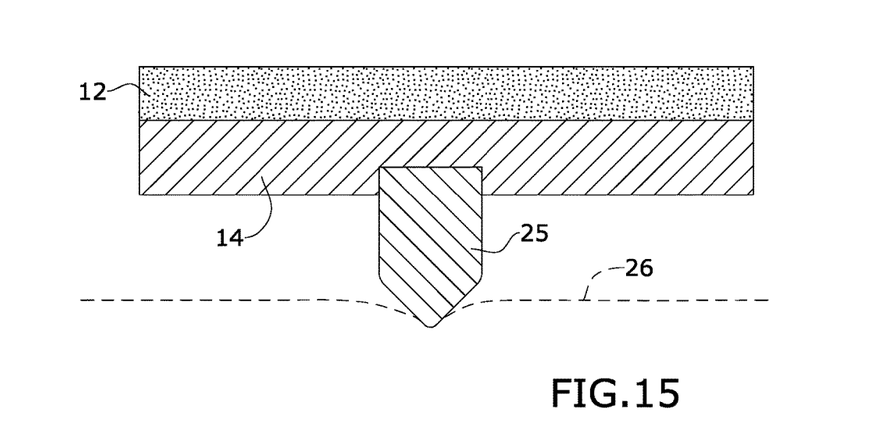
FIG. 15 is a sectional view taken along line 15-15 in FIG. 13.

According to an alternate embodiment as depicted in FIGS. 13-15, cover 14 may itself be used as a stand-alone unit, to provide a high friction and heat resistant surface within vehicle 20, for transport of food container 22 or other item. In embodiments, cover 14 configured as a stand-alone unit, may comprise a top surface lined with lining material 12, which is heat and slip resistant to prevent food container 22 or other item from slipping and/or burning the lining of the vehicle floor. Cover 14 may further comprise anchors 25 configured to prevent cover 14 from moving around the vehicle floor during transport. In embodiments, the vehicle floor may be a carpeted or upholstered surface 26 of the trunk or other area of the vehicle. In one embodiment, anchors 25 may comprise stainless steel pegs with pointed ends configured to snag into surface 26. In some embodiments, the vehicle floor may be provided with recessed cavities into which anchors 25 may insert. In embodiments, cover 14, configured as a stand-alone unit may be approximately 14 inches by approximately 18 inches.

The disclosed system may be useful in transporting a food, and particularly liquid and/or spillable food, to a friend's home, party, family function, or other event or location without spilling the food, and/or creating a mess in the vehicle. In further embodiments, the disclosed system may be used for transporting other items, such as grocery bags, coolers, toys, tools, bulky items, wheeled items, sport items, balls, suitcases, etc.

In some embodiments, the disclosed system may be used for transporting items within a truck bed, which may comprise providing a recessed cavity within the bed of the truck and placing items within the recessed cavity. In certain embodiments, the recessed cavity may be provided within the flatbed of a truck vehicle. The recessed cavity may comprise a heat-resistant and/or non-slip lining which prevents the items from slipping/tumbling, and may further hold a heated food container without damage to the lining. It is to be appreciated that users of trucks may want to keep items in their truck bed from moving around and banging the side of the truck bed thereby damaging the items and the truck bed and floor. Said items may include, but are not limited to, food containers, coolers, tools, generators, equipment, grocery bags, toys, bulky items, wheeled items, sport items, balls, suitcases, etc.

In embodiments, the disclosed subject matter may be implemented by carving out a sunken cavity in the trunk floor, truck bed, or other floor location of an existing vehicle and placing a slip and/or heat resistant lining within the cavity. In some alternate embodiments, a vehicle may be manufactured with a recessed cavity, as described herein. In some further embodiments, a floor panel that includes a recessed cavity and cover, as described herein, may be placed over an existing vehicle floor as an overlay.

As such, the disclosed subject matter provides a convenient and secure system for transporting items within a vehicle and prevents the items from spilling, shifting, rolling, and/or damaging the vehicle surface. It shall be appreciated that the size, shape and location of the recessed cavity disclosed herein can vary according to alternate embodiments. It shall be appreciated that the components of the invention described in several embodiments herein may comprise any alternative known materials in the field and be of any color, design, size and/or dimensions. It shall be appreciated that the components of the invention described herein may be manufactured and assembled using any known techniques in the field.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for transporting an item in a vehicle, the method comprising:

placing the item within a recessed cavity provided in a floor section of the vehicle;
wherein the recessed cavity has a bottom lining made of a slip resistant material and at least one side wall, wherein the slip resistant material prevents the item from tumbling during transport,
wherein the recessed cavity is a depression carved within the floor section of the vehicle,
wherein the side wall extends downwards from the floor section,
wherein the recessed cavity includes a cover, the cover being configured to situate within the recessed cavity and to be removed from the recessed cavity,
wherein a top surface of the cover integrates with said floor section of the vehicle, such that the cover aligns with the floor section to provide a leveled and substantially uninterrupted floor when the cover is situated within said recessed cavity;

removing the cover from the recessed cavity prior to placing the item within the recessed cavity,
wherein the cover includes a handle configured to facilitate its removal from the recessed cavity; and
attaching the cover to a designated attachment section in the vehicle after removing the cover from the recessed cavity, said designated attachment section being configured to secure the cover to prevent it from moving within the vehicle.

2. The method of claim 1, wherein the top surface of the cover is made of a material which matches a material of the floor section.

3. The method of claim 1, wherein the designated attachment section is in the floor section.

4. The method of claim 1, wherein the cover is hingedly coupled proximate an edge of the recessed cavity.

5. The method of claim 4, wherein the cover includes at least one side flap.

6. The method of claim 5, wherein the side flap is rotationally coupled to the cover.

7. The method of claim 1, wherein the recessed cavity is provided in the floor section of the vehicle trunk or flatbed.

8. The method of claim 1, wherein the material of the bottom lining of the recessed cavity is further heat resistant.

9. The method of claim 1, wherein the recessed cavity has a depth less than the thickness of the vehicle floor.

10. The method of claim 1, wherein the recessed cavity has a depth of between about ¼ of an inch to about 3 inches.

11. The method of claim 1, wherein the recessed cavity is rectangular.

12. The method of claim 1, wherein the slip resistant material is silicone.

13. The method of claim 1, wherein item is a food item within a container.

14. The method of claim 1, wherein the item comprises one or more grocery bags.

15. The method of claim 1, wherein the item is a cooler.

16. The method of claim 1, wherein the vehicle is a truck.

* * * * *